United States Patent [19]
Hori

[11] Patent Number: 5,784,381
[45] Date of Patent: Jul. 21, 1998

[54] STORED PROGRAM CONTROLLED PBX ACCOMMODATING SECONDARY RATE TIE TRUNKS USING PRIMARY RATE INTERFACES

[75] Inventor: Yoshihiro Hori, Tokyo, Japan

[73] Assignee: NEC Corporation, Tokyo, Japan

[21] Appl. No.: 665,093

[22] Filed: Jun. 14, 1996

[51] Int. Cl.$^6$ .............................. H04Q 11/04; H04J 3/04
[52] U.S. Cl. ............................................. 370/509; 370/535
[58] Field of Search ........................... 370/375, 465, 370/476, 509, 535

[56] References Cited

U.S. PATENT DOCUMENTS

| | | | |
|---|---|---|---|
| 4,881,224 | 11/1989 | Bains | 370/538 |
| 4,958,342 | 9/1990 | Williams et al. | 370/465 |
| 5,453,989 | 9/1995 | Kitayama et al. | 370/535 |

OTHER PUBLICATIONS

G. Coppadoro et al., "Data Communications In An ISPBX", International Conference on Private Switching Systems and Networks (Conf. Publ. No. 288), pp. 111–116, Jun. 1988.

*Primary Examiner*—Melvin Marcelo
*Attorney, Agent, or Firm*—Foley & Lardner

[57] ABSTRACT

In an SPC PBX, a frame bit is inserted at periodic intervals to each of time-slot sequences from output ports of a time switch to form primary rate frames and the frame bit is then removed from each primary rate frame, producing time-slot sequences which are multiplexed and framing bits are inserted to form an outgoing secondary rate frame for transmission. An incoming secondary rate frame is received and framing bits are removed therefrom and demultiplexed into incoming primary rate time-slot sequences. A frame bit is inserted to each of the incoming primary rate time-slot sequences and the frame bit is then removed before being supplied to input ports of the time switch. The frame bit insertion and removal allows the use of current design primary rate interfaces, so that secondary rate interfaces can be installed without altering the operating software of the switch.

7 Claims, 3 Drawing Sheets

STORED PROGRAM CONTROLLED PBX ACCOMMODATING SECONDARY RATE TIE TRUNKS USING PRIMARY RATE INTERFACES

BACKGROUND OF THE INVENTION

1. Field of the Invention

The present invention relates to stored program controlled private branch exchanges (PBXs) and more specifically to a SPC PBX connected via digital tie trunks to a distant PBX.

2. Description of the Related Art

Current stored program controlled PBXs use ISDN primary rate interfaces for interconnecting distant PBXs. Naturally, there is a need to carry information on a higher level of digital hierarchy by using ISDN secondary rate tie trunks. However, since the current SPC PBXs are not designed with the frame format of the ISDN secondary rate in mind, the installation of secondary rate interfaces in the current SPC PBX requires large scale alterations in system software.

SUMMARY OF THE INVENTION

It is therefore an object of the present invention to provide a stored program controlled PBX which facilitates installation of secondary rate interfaces without design changes in system software.

According to the present invention there is provided a private branch exchange comprising a time-division switch having a plurality of output ports and a plurality of input ports, and a controller for controlling the switch to establish time-divided outgoing connections to the output ports and time-divided incoming connections from the input ports according to a stored program. A first group of outgoing primary rate interfaces are connected to the output ports for respectively receiving a plurality of time-slot sequences in which time slots occur at a primary rate and inserting a frame bit at periodic intervals to each of the received time-slot sequences to form a plurality of outgoing primary rate frames. A second group of outgoing primary rate interfaces are provided for respectively receiving the outgoing primary rate frames and removing the frame bit from each of the outgoing primary rate frames to form a plurality of time-slot sequences. A time-division multiplexer provides multiplexing of the time-slot sequences from the second group outgoing primary rate interfaces into a time-slot sequence in which time slots occur at a secondary rate higher than the primary rate. An outgoing secondary rate interface provides inserting of framing bits to the time-slot sequence from the multiplexer to form an outgoing secondary rate frame and transmitting the outgoing secondary rate frame via an outgoing tie trunk to a distant private branch exchange. An incoming secondary rate interface receives an incoming secondary rate frame from the distant private branch exchange via an incoming tie trunk and removes framing bits from the received secondary rate frame to produce a time-slot sequence. A time-division demultiplexer provides demultiplexing of the time-slot sequence from the incoming secondary rate interface into a plurality of time-slot sequences in which time slots occur at the primary rate. A first group of incoming primary rate interfaces are provided for respectively receiving the time-slot sequences from the demultiplexer and inserting a frame bit at periodic intervals to each of the received time-slot sequences to form a plurality of incoming primary rate frames. A second group of incoming primary rate interfaces respectively receive the incoming primary rate frames and remove the frame bit from each of the incoming primary rate frames to form a plurality of time-slot sequences and supplies the time-slot sequences to the input ports of the time-division switch.

Since the first group outgoing primary rate interfaces and the second group incoming primary rate interfaces are respectively connected to the output ports and input ports of the time-division switch in the same manner as in the current design, it is not necessary to alter the stored program of the controller.

BRIEF DESCRIPTION OF THE DRAWINGS

The present invention will be described in further detail with reference to the accompanying drawings, in which.

DETAILED DESCRIPTION

Figure 1:
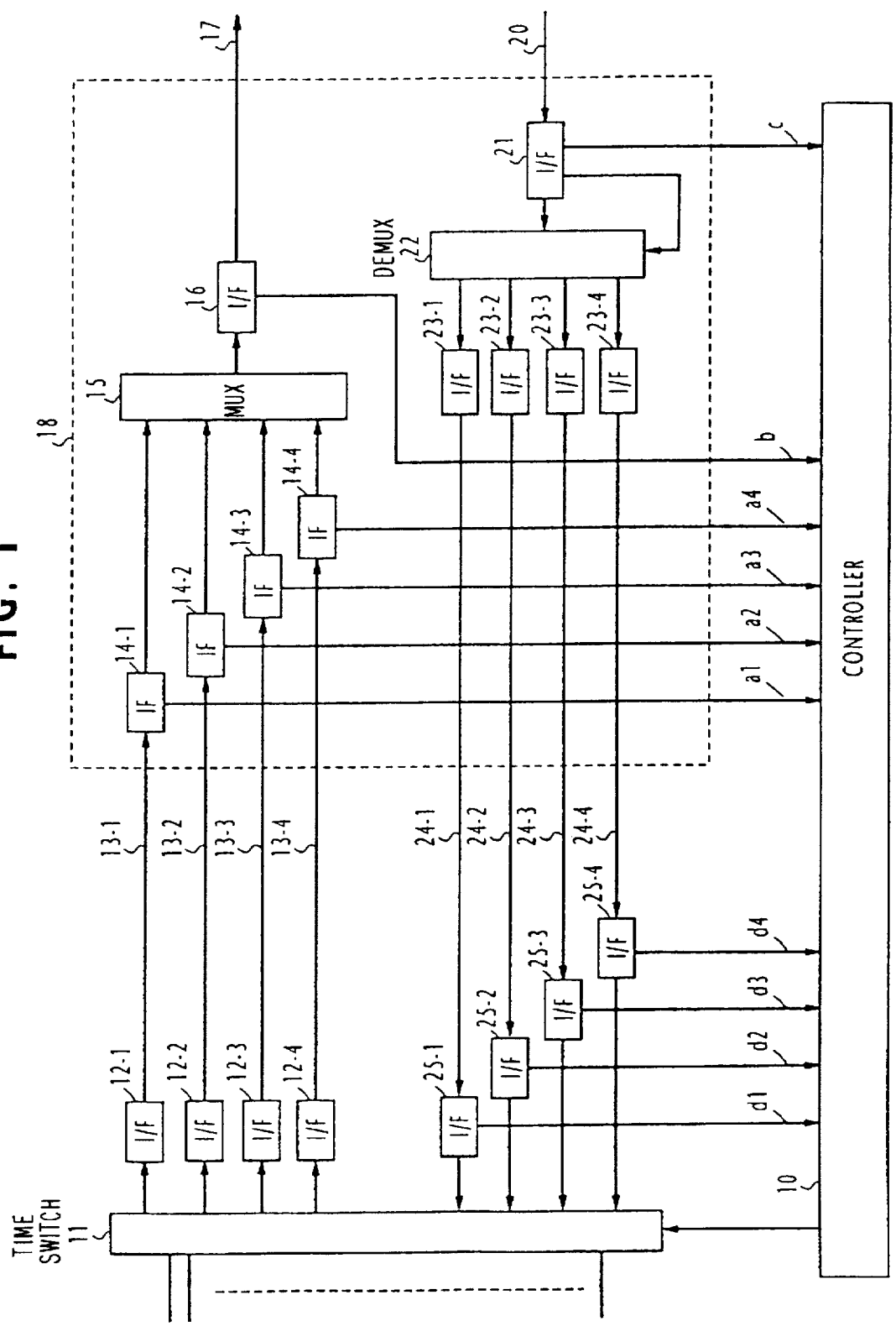
FIG. 1 is a block diagram of a private branch exchange according to the present invention.

Referring to FIG. 1, there is shown a private branch exchange using a stored-program-controlled time division switching system and a multiplexer/demultiplexer according to the present invention. A time switch 11 provides interchanging of 8-bit time slots under the control of a controller 10. Controller 10 controls the time switch 11 to establish time-divided outgoing connections to the output ports and time-divided incoming connections from the input ports in response to a request from PBX user stations.

Figure 2:
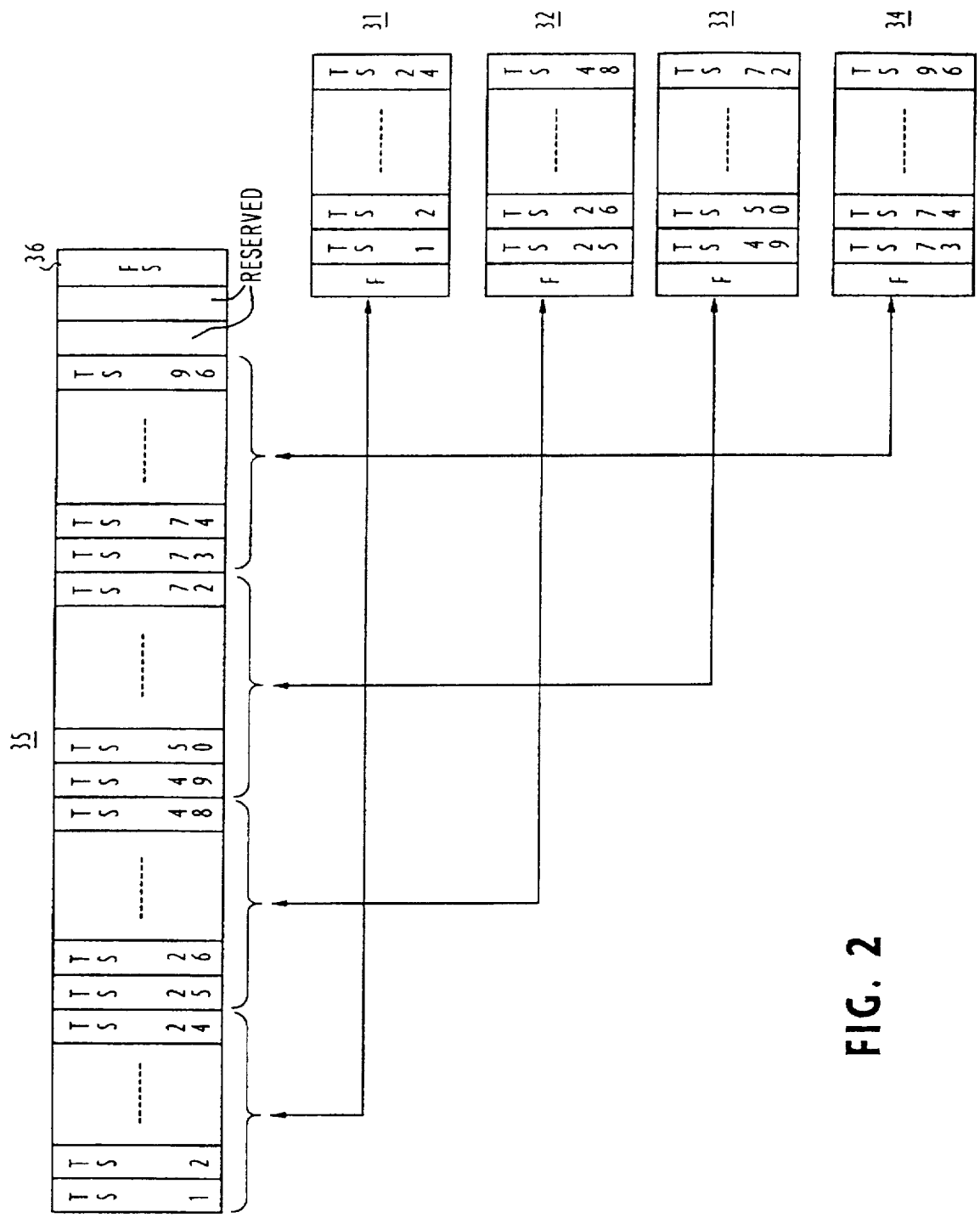
FIG. 2 is an illustration of the frame formats of primary rate frames and secondary rate frame.

Primary rate interfaces 12-1 to 12-4 of known design are connected to the output ports of the time switch 11 in the same manner as in prior art PBX. Primary rate interfaces 12-1 to 12-4 each receive time slots at the primary rate of ISDN from the associated output ports of the switch 11 and insert a frame bit (F) at the beginning of every 24 time slots to form a set of four primary rate outgoing frames of 193 bits each. As illustrated in FIG. 2, the primary rate frames produced by interfaces 12-1, 12-2, 12-3 and 12-4 are designated 31, 32, 33 and 34, respectively, and the time slots contained in these frames are consecutively numbered from the 1st to the 24th for frame 31, from the 25th to the 48th for frame 32, from the 49th to the 72nd for frame 33, and from the 73rd to the 96th for frame 34. The time slot numbers of these primary rate frames correspond to the time slot numbers of a secondary rate frame 35.

The outputs of primary rate interfaces 12-1 to 12-4 are connected through lines 13-1 to 13-4 to primary rate interfaces 14-1 to 14-4. Each interface 14-i (where i=1, 2, 3, 4) removes the frame bit from the primary rate frame and supplies the 24 time slots to a time-division multiplexer 15. In addition, interface 14-i monitors the associated incoming line 13-i and alarms the controller 10 if an undesirable condition occurs on the monitored line. For this purpose, lines a1 to a4 are provided from these interfaces to controller 10. Four parallel streams of 24 time slots appear at the inputs of multiplexer 15 where they are sequentially time-division multiplexed into a stream of 96 time slots. The output of multiplexer 15 is fed into a secondary rate interface 16 where a 5-bit framing sequence FS is inserted for synchronization in a slot position as designated 36 in FIG. 2 to mark the end of the secondary rate frame 35. This secondary rate frame is forwarded onto a one-way tie (dedicated) line 17 and transmitted to a distant PBX. In addition to the insertion of a 5-bit framing sequence, the secondary rate interface 16 monitors the tie trunk 17 and calls the attention of the controller 10 via line "b" if an undesirable condition occurs on the monitored tie trunk.

An incoming secondary rate frame of the format 35 from the distant PBX is received via a one-way tie trunk 20 at a secondary rate interface 21. Interface 21 removes the 5-bit framing sequence from the secondary rate frame and monitors the tie trunk 20 to alarm the controller via line "c" if there is an undesirable condition on tie trunk 20. The line "c" also carries information from the incoming secondary rate interface 21 to the controller 10. The output of interface 21 is supplied to a time division demultiplexer 22. Demultiplexer 22 responds to the removal of the framing sequence by interface 21 for decomposing the 96 time slots into four segments of 24 time slots each and supplying the 24 time-slot segments at the primary rate to primary rate interfaces 23-1 to 23-4, respectively. In each of the interfaces 23 a frame bit is inserted to the beginning of each 24 time-slot segment, producing a set of four primary rate frames 31, 32, 33 and 34 (FIG. 2). The outputs of primary rate interfaces 23 are coupled through lines 24-1 to 24-4 to primary rate interfaces 25-1 to 25-4. Each interface 25 removes the frame bit from the primary rate frame to supply a sequence of 24 time slots to a corresponding input port of the switch 11. In addition to the removal of a frame bit, each interface 25-i monitors the associated line 24-i and alarms the controller 10 via lines d1 to d4 if an undesirable condition occurs on the monitored line.

Note that primary rate interfaces 14, 23, multiplexer 15, demultiplexer 22 and secondary rate interfaces 16, 21 are assembled into an integral unit, or tie-trunk circuit 18 so that it can be installed as the system expands. Therefore, there is a likelihood of the occurrence of disconnection in lines 13 and 24. The primary rate interfaces 14 and 25 monitor these lines. If one of these lines fails, the controller marks the associated port of the switch 11 to prevent it from being used.

Primary rate interfaces 12 and 25 are of the same design as those used in the prior art PBX. Due to the provision of the same interfaces, the present invention allows a new or existing PBX to install the tie trunk circuit 18 without making a large scale alteration in the software program of the controller 10.

Figure 3:
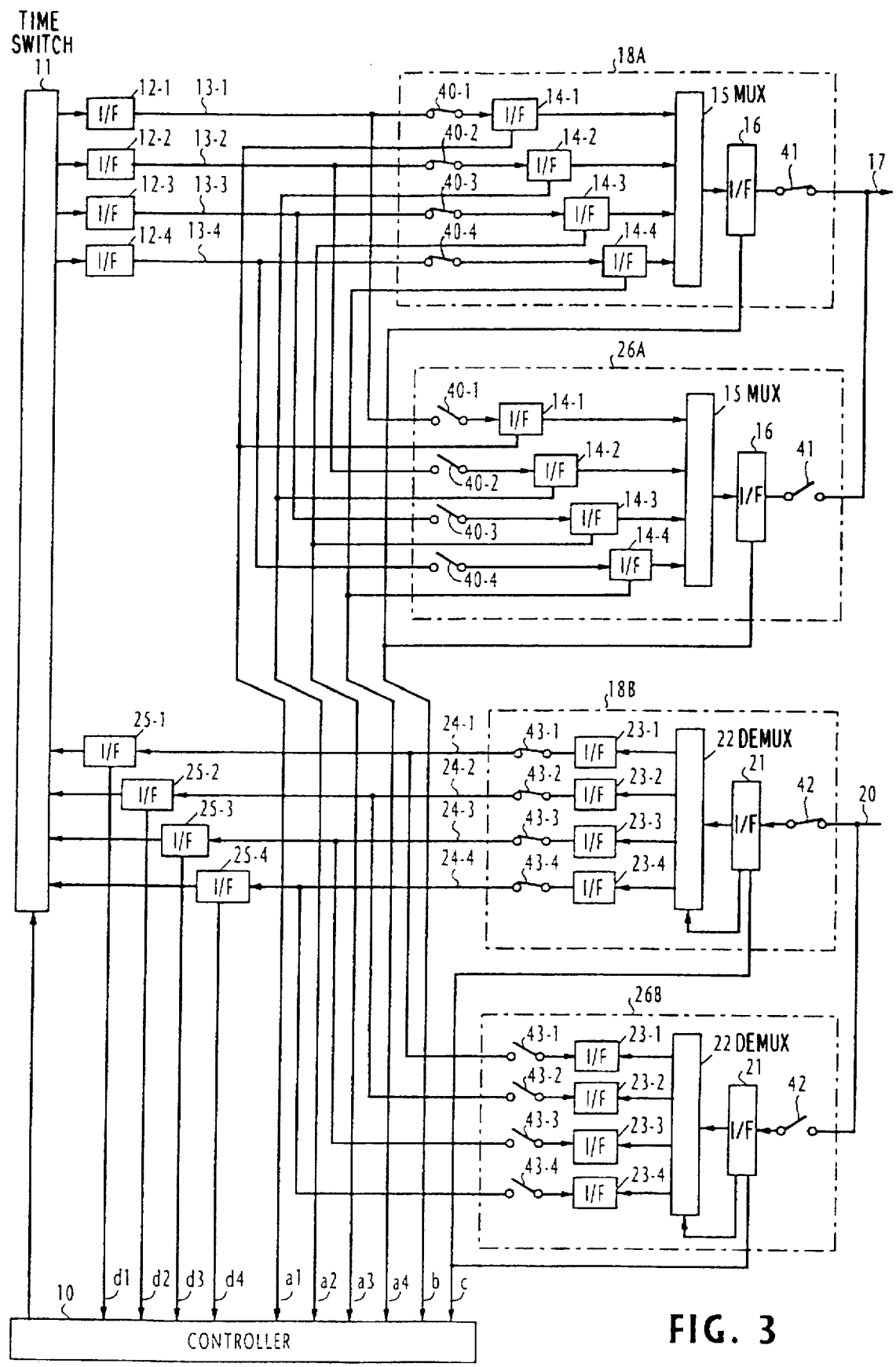
FIG. 3 is a block diagram of a modified private branch exchange in which tie-trunk circuits are duplicated.

The tie trunk circuit 18 is preferably duplicated by a backup (standby) circuit 26 as shown in FIG. 3 to ensure continuity of service when the active circuit should fail. The integral tie-trunk circuit 18 is divided into transmit and receive units 18A and 18B. The transmit unit 18A includes on-off switches 40-1 to 40-4 disposed in the input lines of primary rate interface 14-1 to 14-4, respectively, and an on-off switch 41 connected in the output line of the secondary rate interface 16. The receive unit 18B has an on-off switch 42 disposed in the input line of secondary rate interface 21 and on-off switches 43-1 to 43-4 disposed in the output lines of primary rate interfaces 23-1 to 23-4, respectively. When the tie-trunk circuit 18 is active, all of its switches are in the closed position as illustrated.

The standby unit 26 is identical in construction to the active unit 18. The transmit unit 26A of the standby unit is connected in parallel to the active transmit unit 18A and the receive unit 26B is connected in parallel to the active receive unit 18B. All the switches of the standby circuit 26 are in the open position.

If a trouble occurs within the active unit 18A or 18B, the switches of the failed unit are open and the switches of the corresponding unit 26A or 26B are closed.

What is claimed is:

1. A private branch exchange comprising:
   a time-division switch having a plurality of output ports and a plurality of input ports;
   a controller for controlling the switch to establish time-divided outgoing connections to said output ports and time-divided incoming connections from said input ports according to a stored program;
   a first group of outgoing primary rate interfaces connected to said output ports for respectively receiving a plurality of time-slot sequences in which time slots occur at a primary rate and inserting a frame bit at periodic intervals to each of the received time-slot sequences to form a plurality of outgoing primary rate frames;
   a second group of outgoing primary rate interfaces for respectively receiving the outgoing primary rate frames and removing the frame bit from each of the outgoing primary rate frames to form a plurality of time-slot sequences;
   a time-division multiplexer for multiplexing the time-slot sequences from the second group outgoing primary rate interfaces into a time-slot sequence in which time slots occur at a secondary rate higher than the primary rate;
   an outgoing secondary rate interface for inserting framing bits to the time-slot sequence from the multiplexer to form an outgoing secondary rate frame and transmitting the outgoing secondary rate frame via an outgoing tie trunk to a distant private branch exchange;
   an incoming secondary rate interface for receiving an incoming secondary rate frame from the distant private branch exchange via an incoming tie trunk and removing framing bits from the received secondary rate frame to produce a time-slot sequence;
   a time-division demultiplexer for demultiplexing the time-slot sequence from the incoming secondary rate interface into a plurality of time-slot sequences in which time slots occur at the primary rate;
   a first group of incoming primary rate interfaces for respectively receiving the time-slot sequences from the demultiplexer and inserting a frame bit at periodic intervals to each of the received time-slot sequences to form a plurality of incoming primary rate frames; and
   a second group of incoming primary rate interfaces for respectively receiving the incoming primary rate frames and removing the frame bit from each of the incoming primary rate frames to form a plurality of time-slot sequences and supplying the time-slot sequences to the input ports of said time-division switch.

2. A private branch exchange as claimed in claim 1, wherein the second group outgoing primary rate interfaces include means for monitoring lines respectively connecting the first group outgoing primary rate interfaces to the second group outgoing primary rate interfaces and alarming said controller if an abnormal condition occurs at one of the monitored lines.

3. A private beach exchange as claimed in claim 1, wherein the second group incoming primary rate interfaces include means for monitoring lines respectively connecting the first group incoming primary rate interfaces to the second group incoming primary rate interfaces and alarming said controller if an abnormal condition occurs at one of the monitored lines.

4. A private branch exchange as claimed in claim 1, wherein the outgoing secondary rate interface includes means for monitoring the outgoing tie trunk and alarming said controller if an abnormal condition occurs at the monitored tie trunk.

5. A private branch exchange as claimed in claim 1, wherein the incoming secondary rate interface includes means for monitoring the incoming tie trunk and alarming said controller if an abnormal condition occurs at the monitored tie trunk.

6. A private branch exchange as claimed in claim 1, further comprising:
   a plurality of on-off switches respectively disposed between the first group outgoing primary rate interfaces and the second group outgoing primary rate interfaces and an on-off switch disposed between the outgoing secondary rate interface and the outgoing tie trunk;
   an on-off switch disposed between the incoming tie trunk and the incoming secondary rate interface and a plurality of on-off switches respectively disposed between the first group incoming primary rate interfaces and the second group incoming primary rate interfaces;
   a standby unit comprising:
      a third group of outgoing primary rate interfaces for respectively receiving the outgoing primary rate frames from the first group outgoing primary rate interfaces and removing the frame bit from each of the outgoing primary rate frames to form a plurality of time-slot sequences;
      a second time-division multiplexer for multiplexing the time-slot sequences from the third group outgoing primary rate interfaces into a time-slot sequence in which time slots occur at the secondary rate;
      a second outgoing secondary rate interface for inserting framing bits for synchronization to the time-slot sequence from the second multiplexer to form an outgoing secondary rate frame and transmitting the outgoing secondary rate frame via said outgoing tie trunk to said distant private branch exchange;
      a second incoming secondary rate interface for receiving an incoming secondary rate frame from the distant private branch exchange via said incoming tie trunk and removing framing bits from the received secondary rate frame to produce a time-slot sequence;
      a second time-division demultiplexer for demultiplexing the time-slot sequence from the second incoming secondary rate interface into a plurality of time-slot sequences in which time slots occur at the primary rate;
      a third group of incoming primary rate interfaces for respectively receiving the time-slot sequences from the second demultiplexer and inserting a frame bit at periodic intervals to each of the received time-slot sequences to form a plurality of incoming primary rate frames;
   a plurality of on-off switches respectively disposed between the first group outgoing primary rate interfaces and the third group outgoing primary rate interfaces and an on-off switch disposed between the second outgoing secondary rate interface of the standby unit and the outgoing tie trunk; and
   an on-off switch disposed between the incoming tie trunk and the second incoming secondary rate interface and a plurality of on-off switches respectively disposed between the third group incoming primary rate interfaces and the second group incoming primary rate interfaces.

7. A method for installing secondary rate interfaces in a private branch exchange without altering a system program, the private branch exchange comprising a time-division switch having a plurality of output ports and a plurality of input ports and a controller for controlling the switch to establish time-divided outgoing connections to said output ports and time-divided incoming connections from said input ports according to the system program, the method comprising the steps of:
   a) receiving from said output ports a plurality of primary rate time-slot sequences and inserting a frame bit at periodic intervals to each of the received time-slot sequences to form a plurality of outgoing primary rate frames;
   b) removing the frame bit from each of the outgoing primary rate frames to form a plurality of primary rate time-slot sequences;
   c) multiplexing the primary rate time-slot sequences into a secondary rate time-slot sequence;
   d) inserting framing bits to the secondary rate time-slot sequence to form an outgoing secondary rate frame and transmitting the outgoing secondary rate frame via an outgoing tie trunk to a distant private branch exchange;
   e) receiving an incoming secondary rate frame from the distant private branch exchange via an incoming tie trunk and removing framing bits from the received secondary rate frame to produce a secondary rate time-slot sequence;
   f) demultiplexing the secondary rate time-slot sequence into a plurality of incoming primary rate time-slot sequences;
   g) inserting a frame bit at periodic intervals to each of the incoming primary rate time-slot sequences to form a plurality of incoming primary rate frames; and
   h) removing the frame bit from each of the incoming primary rate frames to form a plurality of incoming primary rate time-slot sequences and supplying the incoming primary rate time-slot sequences to the input ports of said time-division switch.

* * * * *

UNITED STATES PATENT AND TRADEMARK OFFICE
CERTIFICATE OF CORRECTION

PATENT NO.   : 5,784,381
DATED        : July 21, 1998
INVENTOR(S)  : Yoshihiro HORI It is certified that error appears in the above-identified patent and that said Letters Patent is hereby corrected as shown below:

On the title page, insert:

--Item [30] Foreign Application Priority Data--, and

--June 14, 1995   [JP]   Japan..............7-147417--.

Signed and Sealed this

Twenty-sixth Day of January, 1999

Attest:

Attesting Officer

Acting Commissioner of Patents and Trademarks